United States Patent
Inuzuka et al.

(10) Patent No.: US 9,677,484 B2
(45) Date of Patent: Jun. 13, 2017

(54) FUEL REFORMER FOR INTERNAL-COMBUSTION ENGINE

(71) Applicant: DENSO CORPORATION, Kariya, Aichi-pref. (JP)

(72) Inventors: Hiroyuki Inuzuka, Obu (JP); Hideki Obayashi, Okazaki (JP); Takeshi Mizobuchi, Obu (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 14/485,161

(22) Filed: Sep. 12, 2014

(65) Prior Publication Data

US 2015/0075451 A1    Mar. 19, 2015

(30) Foreign Application Priority Data

Sep. 13, 2013 (JP) ................................. 2013-191171

(51) Int. Cl.
*F01N 3/00* (2006.01)
*F01N 3/10* (2006.01)
(Continued)

(52) U.S. Cl.
CPC ........... *F02D 41/0055* (2013.01); *F01N 5/02* (2013.01); *F02B 43/12* (2013.01); *F02D 41/0065* (2013.01); *F02M 26/35* (2016.02); *F02M 26/36* (2016.02); *F01N 2240/30* (2013.01); *F01N 2610/03* (2013.01); *F02D 41/123* (2013.01); *F02D 2041/0017* (2013.01);
(Continued)

(58) Field of Classification Search
CPC .... F01N 2240/30; F01N 2610/03; F01N 5/02; F02B 43/12; F02D 2041/0017; F02D 2200/0802; F02D 41/0055; F02D 41/0065; F02D 41/123; Y02T 10/16; Y02T 10/32; Y02T 10/47
USPC ........................... 60/278, 286, 295, 301, 303
See application file for complete search history.

(56) References Cited

U.S. PATENT DOCUMENTS

| | | | |
|---|---|---|---|
| 9,032,913 B2* | 5/2015 | Hoshino | B01J 23/96 123/3 |
| 2010/0300382 A1* | 12/2010 | Yahagi | C01B 3/323 123/3 |

(Continued)

FOREIGN PATENT DOCUMENTS

JP    2009-144612    7/2009

*Primary Examiner* — Phutthiwat Wongwian
*Assistant Examiner* — Diem Tran
(74) *Attorney, Agent, or Firm* — Nixon & Vanderhye PC

(57) ABSTRACT

A fuel reformer includes a reforming-fuel injection valve and a fuel reformer catalyst disposed in an EGR pipe and performs a catalyst recovery control when a preset fuel cut execution condition is satisfied. In the catalyst recovery control, a fuel reforming capacity of the fuel reformer catalyst is recovered by stopping an injection of a main fuel and an injection of a reforming-fuel, while supplying additional air to the catalyst by maintaining both of an EGR valve and a throttle valve in a valve open state. Further, in the catalyst recovery control, temperature and a carbon deposit amount of the fuel reformer catalyst are estimated or detected based on which of an opening of the EGR valve and an opening of the throttle valve are adjusted. As a result, fuel reforming capacity is recovered without decreasing a fuel consumption rate improvement effect and a worsening of exhaust emission or drivability.

9 Claims, 8 Drawing Sheets

(51) Int. Cl.
*F02D 41/00* (2006.01)
*F02B 43/12* (2006.01)
*F01N 5/02* (2006.01)
*F02M 26/35* (2016.01)
*F02M 26/36* (2016.01)
*F02D 41/12* (2006.01)
*F02M 26/15* (2016.01)

(52) U.S. Cl.
CPC ..... *F02D 2200/0802* (2013.01); *F02M 26/15* (2016.02); *Y02T 10/16* (2013.01); *Y02T 10/32* (2013.01); *Y02T 10/47* (2013.01)

(56) References Cited

U.S. PATENT DOCUMENTS

| | | | | |
|---|---|---|---|---|
| 2012/0312087 | A1* | 12/2012 | Inuzuka | F01N 11/007 73/114.45 |
| 2012/0312255 | A1* | 12/2012 | Leone | F02D 41/0027 123/3 |
| 2013/0333639 | A1 | 12/2013 | Hoshino et al. | |
| 2014/0196702 | A1* | 7/2014 | Gingrich | F02D 41/0065 123/568.21 |

* cited by examiner

FIG. 3   OUTLINE OF CATALYST REFORMING CONTROL

FIG. 4 OPENING ADJUSTMENT ACCORDING TO TEMPERATURE OF FUEL REFORMER CATALYST

FIG. 5 OPENING ADJUSTMENT WHEN FUEL REFORMING CAPACITY HAS RECOVERED BEFORE END OF FUEL CUT

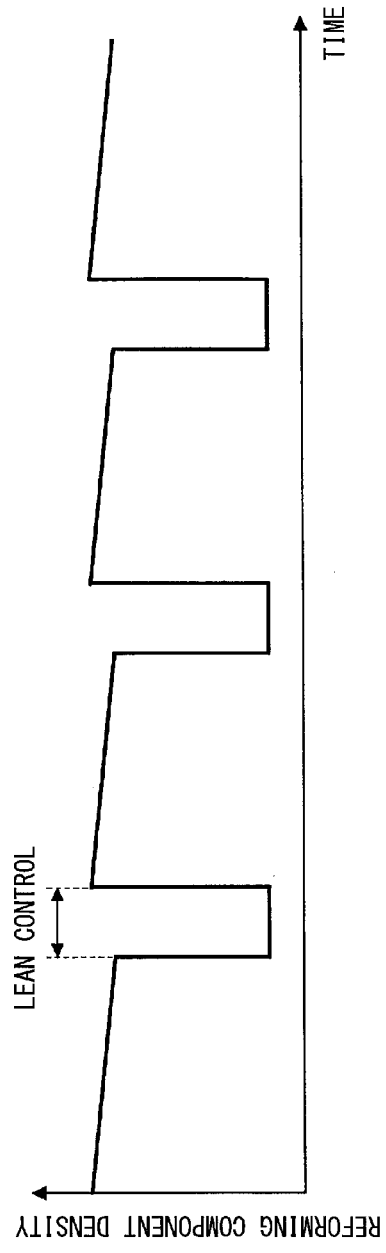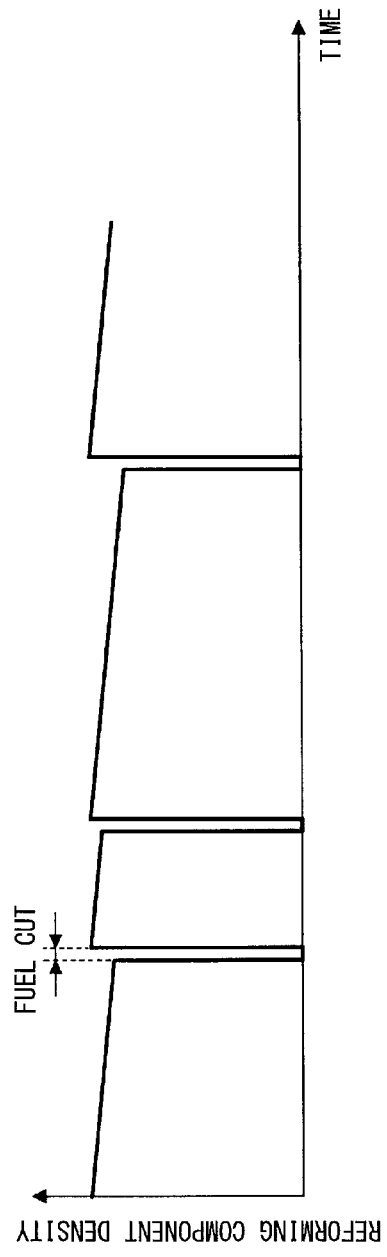

FUEL REFORMER FOR INTERNAL-COMBUSTION ENGINE

CROSS REFERENCE TO RELATED APPLICATION

The present application is based on and claims the benefit of priority of Japanese Patent Application No. 2013-191171, filed on Sep. 13, 2013, the disclosure of which is incorporated herein by reference.

TECHNICAL FIELD

The present disclosure generally relates to a fuel reformer for an internal-combustion engine having a fuel reformer catalyst.

BACKGROUND INFORMATION

A technique for reforming fuel for an internal-combustion engine to improve a fuel consumption rate is proposed in a patent document 1 (i.e., JP-A-2009-144612). The proposed technique includes a reforming-fuel injection valve which injects a reforming-fuel into an EGR passage and a fuel reformer catalyst which reforms the reforming-fuel within the EGR passage. The EGR passage partially returns an exhaust gas of the internal-combustion engine from an exhaust passage to an air-intake passage as an EGR gas. Then, the reforming-fuel injected by the reforming-fuel injection valve and water vapor in the EGR gas is put into a reforming reaction by the fuel reformer catalyst. The reforming reaction produces hydrogen, carbon monoxide, etc. which increases the flammability of the reformed fuel. The reformed fuel is then provided to the air-intake passage of the internal-combustion engine.

However, in such a system that utilizes a fuel reformer catalyst, carbon in the EGR gas may deposit on the reformer catalyst and, over time, accumulation of carbon deposits on the fuel reformer catalyst may deteriorate the fuel reforming capacity of the fuel reformer catalyst.

When the technique in the above-mentioned patent document 1 detects degradation of the fuel reformer catalyst and a deterioration of the fuel reforming capacity, injection of the reforming-fuel by the reforming-fuel injection valve is stopped and an air-fuel ratio of the exhaust gas is controlled to be slightly leaner than a stoichiometric ratio. The leaner air-fuel ratio provides a catalyst recovery control which burns the deposit carbon on the fuel reformer catalyst by supplying oxygen to the catalyst and recovers the fuel reforming capacity of the fuel reformer catalyst.

In such a case, while performing the catalyst recovery control which stops an injection of the reforming-fuel, the reforming component density (e.g., density of hydrogen or carbon monoxide) in the EGR gas, which flows back to the air-intake passage, decreases greatly. However, the catalyst recovery control of the above-mentioned patent document 1 stops the injection of the reforming-fuel during the operating the engine (i.e., while the fuel is burned in the engine) for performing the catalyst recovery control. Therefore, when the catalyst recovery control is performed during an operation of an internal-combustion engine, by stopping the injection of the reforming-fuel, the reforming component density in the EGR gas greatly decreases, and the flammability of the internal-combustion engine decreases. For such a reason, a fuel consumption rate improvement effect of the fuel reformer decreases, and exhaust emission and drivability may worsen.

SUMMARY

It is an object of the present disclosure to provide a fuel reformer for an internal-combustion engine which is capable of recovering the fuel reforming capacity of the fuel reformer catalyst without decreasing a fuel consumption rate improvement effect and a worsening of exhaust emission or drivability.

In an aspect of the present disclosure, a fuel reformer for an internal combustion engine includes a main fuel injector injecting a main fuel that is supplied to an internal combustion engine, a throttle valve adjusting an intake air amount for the engine, an EGR passage returning a portion of an exhaust gas from an exhaust passage of the engine to an air-intake passage as an EGR gas, and an EGR valve adjusting a flow amount of the EGR gas. A reforming-fuel injector injects a reforming-fuel into the EGR passage. A fuel reformer catalyst is disposed in the EGR passage and reforms the reforming-fuel injected by the reforming-fuel injector. A catalyst recovery controller executes a catalyst recovery control that includes performing a fuel cut, which stops an injection of the main fuel and the reforming-fuel, and maintaining the EGR valve and the throttle valve in a valve open state to supply additional air to the fuel reformer catalyst and recover a fuel reforming capacity of the fuel reformer catalyst.

The catalyst recovery control of the present disclosure when a predetermined fuel cut execution condition is satisfied (e.g., at a time of a slowdown of the internal-combustion engine), a fuel cut which stops injection of both of the main fuel and the reforming-fuel is performed. During such a fuel cut, by maintaining both of the EGR valve and the throttle valve in a valve open state, additional air (i.e., oxygen) is introduced into the EGR passage for an increased supply of oxygen to the fuel reformer catalyst. In such manner, the carbon deposited on the fuel reformer catalyst is burned promptly, and the fuel reforming capacity of the fuel reformer catalyst is quickly recovered.

In such a case, the catalyst recovery control is performed during a fuel cut at a fuel cut execution condition satisfied time, that is, during an engine combustion stop time. Therefore, even when the reforming component density in the EGR gas decreases greatly due to the stopping of the injection of the reforming-fuel, the fuel cut does not causes a decrease of the fuel consumption rate improvement effect or a worsening of exhaust emission and drivability. Further, since there is no need to newly install an oxygen supply device for supplying oxygen to the fuel reformer catalyst, a cost reduction is realized.

BRIEF DESCRIPTION OF THE DRAWINGS

Objects, features, and advantages of the present disclosure will become more apparent from the following detailed description made with reference to the accompanying drawings, in which:

FIG. 9A is a time chart of the reforming component density when performing a conventional the catalyst recovery control; and FIG. 9B is a time chart of the reforming component density when performing the catalyst recovery control of the present embodiment.

DETAILED DESCRIPTION

An embodiment which realizes the present disclosure is described.

Figure 1:
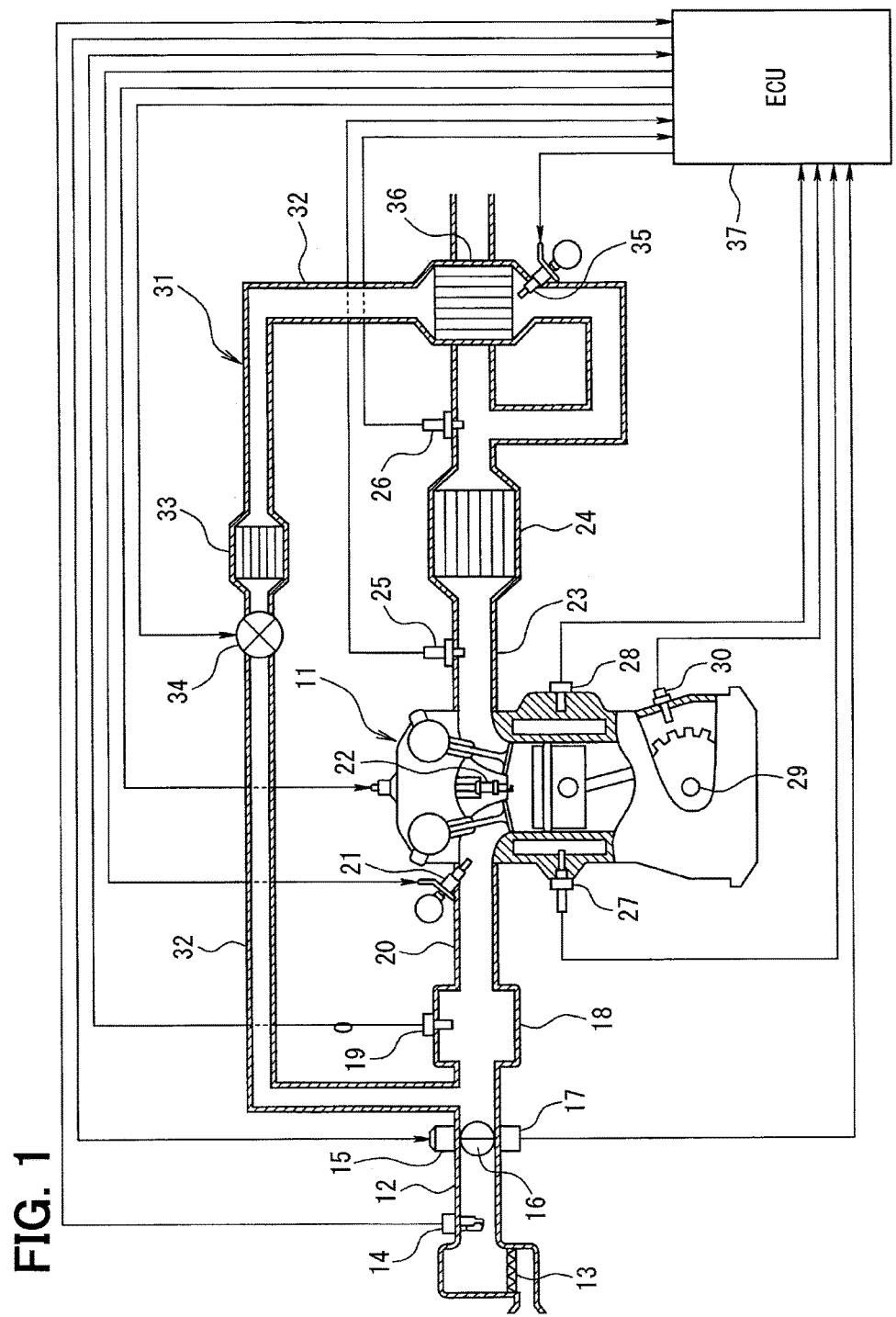
FIG. 1 is an outline configuration of an engine control system in one embodiment of the present disclosure.

First, based on FIG. 1, an outline configuration of an entire engine control system is described.

An air cleaner 13 is disposed at the most upstream part of an air-intake pipe 12 (i.e., an air-intake passage) of the engine 11 which is an internal-combustion engine, and an air flow meter 14 which detects an intake air amount is disposed on a downstream side of the air cleaner 13. On the downstream side of the air flow meter 14, a throttle valve 16 whose opening degree is adjusted by a motor 15 as well as a throttle opening sensor 17 which detects the opening degree (i.e., a throttle opening) of the throttle valve 16 are disposed.

Further, a surge tank 18 is disposed on the downstream side of the throttle valve 16, and this surge tank 18 has an intake-pipe-pressure sensor 19 which detects an intake pipe pressure is disposed thereon. Further, an intake manifold 20 which introduces air into each of the many cylinders of the engine 11 is disposed on the surge tank 18, and, to an intake port that is connected to the intake manifold 20 of respective cylinders or to a proximity thereof, a main fuel injection valve 21 (i.e., main fuel injection unit) which injects a main fuel into an intake port is attached. Further, a spark plug 22 is attached to a cylinder head of the engine 11 on every cylinder, and a fuel gas (i.e., air-fuel mixture) in each of those cylinders is burned by a spark of each spark plug 22.

On the other hand, an exhaust pipe 23 (i.e., exhaust passage) of the engine 11 has a catalyst 24 disposed thereon, such as a three-way catalyst etc. which purifies exhaust gas, and, on upstream and downstream sides of the catalyst 24, exhaust gas sensors 25 and 26 (i.e., an air-fuel ratio sensor, an oxygen sensor, etc.) which detect an air-fuel ratio, or rich/lean of exhaust gas, etc., are disposed.

Further, a coolant temperature sensor 27 which detects coolant temperature and a knock sensor 28 which detects a knock are attached to the cylinder block of the engine 11. Furthermore, a crank angle sensor 30 which outputs a pulse signal is attached to an outer circumference of a crankshaft 29, which is indicative of a predetermined rotation angle of the crankshaft 29, and a crank angle and an engine rotation speed are detected based on the output of the crank angle sensor 30.

An EGR device 31 returning from the exhaust pipe 23 to the intake pipe 12 a part of the exhaust gas, which is designated as an EGR gas, is installed on the engine 11. As a part of this EGR device 31, an EGR pipe 32 (i.e., EGR passage) connects the downstream side of the catalyst 24 of the exhaust pipe 23 and the downstream side of the throttle valve 16 of the air-intake pipe 12, and, on the EGR pipe 32, an EGR cooler 33 which cools the EGR gas and an EGR valve 34 which adjusts a flow amount of the EGR gas are disposed. When the EGR valve 34 opens, the EGR gas returns from the exhaust pipe 23 to the intake pipe 12 through the EGR pipe 32.

A reforming-fuel injection valve 35 (i.e., reform fuel injection unit) which injects a reforming-fuel into the EGR pipe 32 is disposed in the EGR pipe 32 on the upstream side of the EGR cooler 33. Fuel is supplied to the main fuel injection valve 21 and the fuel reform injection valve 35 from a common fuel tank (not shown). Further, a fuel reformer catalyst 36 which reforms the reforming-fuel injected by the reforming-fuel injection valve 35 is arranged on the downstream side of the reforming-fuel injection valve 35 in the EGR pipe 32. This fuel reformer catalyst 36 is configured to perform heat exchange with the exhaust gas flowing through an inside of the exhaust pipe 23, performing a reforming reaction between the moisture (i.e., water vapor) in the EGR gas, etc. and the reforming-fuel by utilizing the heat of the exhaust gas, for making hydrogen and carbon monoxide, which results in a reform of the reforming-fuel and makes a highly-flammable reformed gas.

The output of the various sensors mentioned above is inputted into an electronic control unit (designated as "ECU" in the following) 37. The ECU 37 implemented primarily as a microcomputer executes program of various kinds about an engine control which is memorized by a built-in ROM (i.e., storage) in the microcomputer, and controls a fuel injection amount, an ignition timing adjustment, a throttle opening (i.e., an intake air amount), etc. according to an engine operation condition.

Further, when a predetermined reform execution condition is satisfied, the ECU 37 opens the EGR valve 34 and returns the EGR gas from the exhaust pipe 24 to the intake pipe 12 through the EGR pipe 32, and injected the reforming-fuel into the EGR pipe 32 by the reforming-fuel injection valve 35, performing the reforming reaction by using the reform catalyst 36 between the moisture (i.e., water vapor) in the EGR gas, etc. and the reforming-fuel, for making hydrogen, carbon monoxide etc., which results in a reform of the reforming-fuel and makes a highly-flammable reformed gas, and the reformed gas is supplied to the intake pipe 12.

Figure 2:
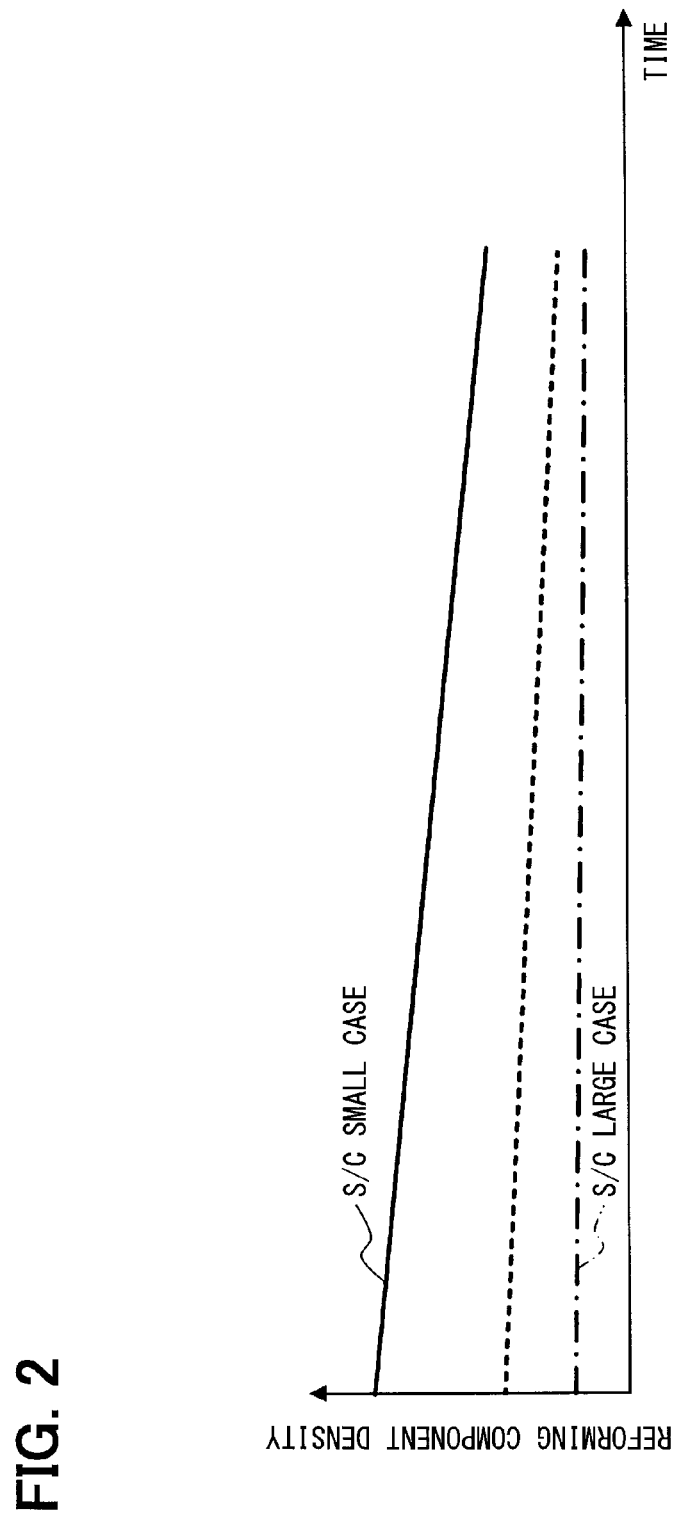
FIG. 2 is a time chart of a reforming component density when not performing the catalyst recovery control.

However, the system provided with the fuel reformer catalyst 36 has the carbon deposit accumulating on the catalyst 36 out of the EGR gas (i.e., exhaust gas), which, as time lapses, is problematic because the accumulated carbon deposit on the catalyst 36 causes a deteriorated fuel reforming capacity as shown in FIG. 2, if a catalyst recovery control is not performed. That is, for example, the density of reforming components, such as hydrogen and carbon monoxide in the EGR gas which flow back to the intake pipe 12, decreases. Note that "S/C" in FIG. 2 means "a ratio between water vapor (i.e., steam) and carbon in the EGR gas."

Then, in the present embodiment, by performing the catalyst recovery control program of FIG. 6 later mentioned in the ECU 37 when a predetermined fuel cut execution condition is satisfied, the catalyst recovery control is performed, which (i) performs a fuel cut that stops an injection of the main fuel and the reforming-fuel and (ii) maintains the EGR valve and the throttle valve in a valve open state, for (A) supplying additional air to the fuel reformer catalyst and (B) recovering a fuel reforming capacity of the fuel reformer catalyst.

Figure 3:
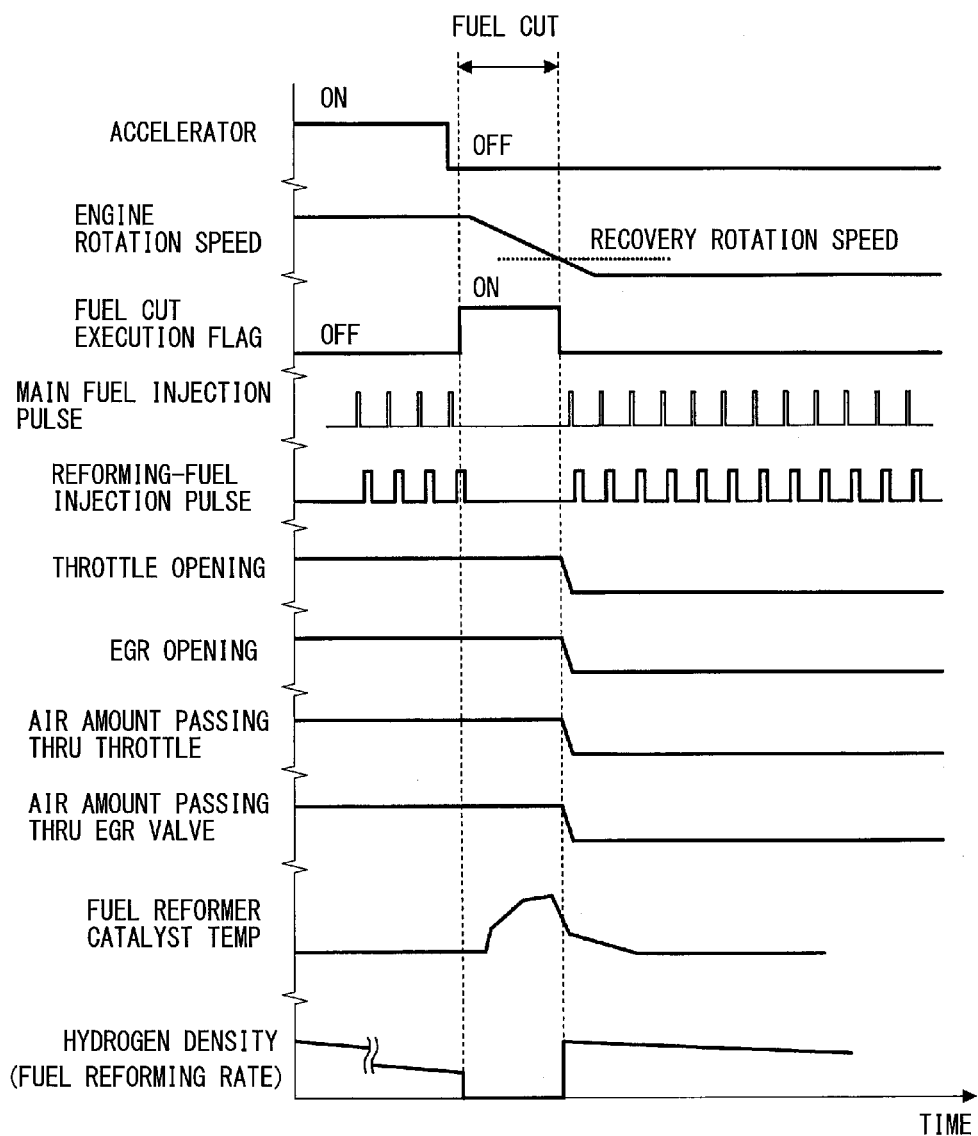
FIG. 3 is a time chart of the catalyst recovery control.

As shown in FIG. 3, the catalyst recovery control of the present embodiment, when a predetermined fuel cut execution condition is satisfied (e.g., when an accelerator is closed and an engine rotation speed is equal to or greater than a predetermined recovery rotation speed (i.e., a predetermined engine rotation speed for executing a recovery process), the fuel cut which stops an injection of both of the main fuel and the reforming-fuel is performed by maintaining both of the EGR valve 34 and the throttle valve 16 in a valve open state during such a fuel cut, which introduces a clean air (i.e., oxygen) into the EGR pipe 32, and the introduced oxygen is supplied to the fuel reformer catalyst 36. In such manner, the carbon deposit on the fuel reformer catalyst 36 is burned promptly, and the fuel reforming capacity of the fuel reformer catalyst 36 is quickly recovered promptly.

Further, in the present embodiment, the temperature and the carbon deposit amount of the fuel reformer catalyst 36 are detected as a state of the fuel reformer catalyst 36 when the catalyst recovery control is performed, and an EGR opening (i.e., an opening degree of the EGR valve 34) and a throttle opening (i.e., opening degree of the throttle valve 16) are adjusted according to the temperature and carbon deposit amount of the fuel reformer catalyst 36. In the following, an adjustment of an EGR opening and an adjustment of a throttle opening is more concretely described.

[Opening Adjustment when the Fuel Reformer Catalyst 36 is at Low Temperature]

If an EGR opening is small when the temperature of the fuel reformer catalyst 36 is low, the amount of oxygen supplied to the fuel reformer catalyst 36 will decrease and the calorific value by carbon combustion will decrease. Therefore, the temperature of the fuel reformer catalyst 36 decreases to be too low, and the fuel reform rate of the fuel reformer catalyst 36 after an end of the catalyst recovery control may deteriorate (i.e., referring to a broken line A in FIG. 4).

Further, if a throttle opening is large when the temperature of the fuel reformer catalyst 36 is low, the additional air rate increases and the temperature decrease of the exhaust gas (i.e., gas flowing through the exhaust pipe 23) or the EGR gas (i.e., gas flowing through the EGR pipe 32) is facilitated, and the flow amount of the exhaust gas increases and the heat dissipation from the fuel reformer catalyst 36 increases. As a result, the temperature of the fuel reformer catalyst 36 decreases to be too low, and the fuel reform rate of the fuel reformer catalyst 36 after an end of the catalyst recovery control may deteriorate (refer to a broken line A in FIG. 4).

Figure 4:
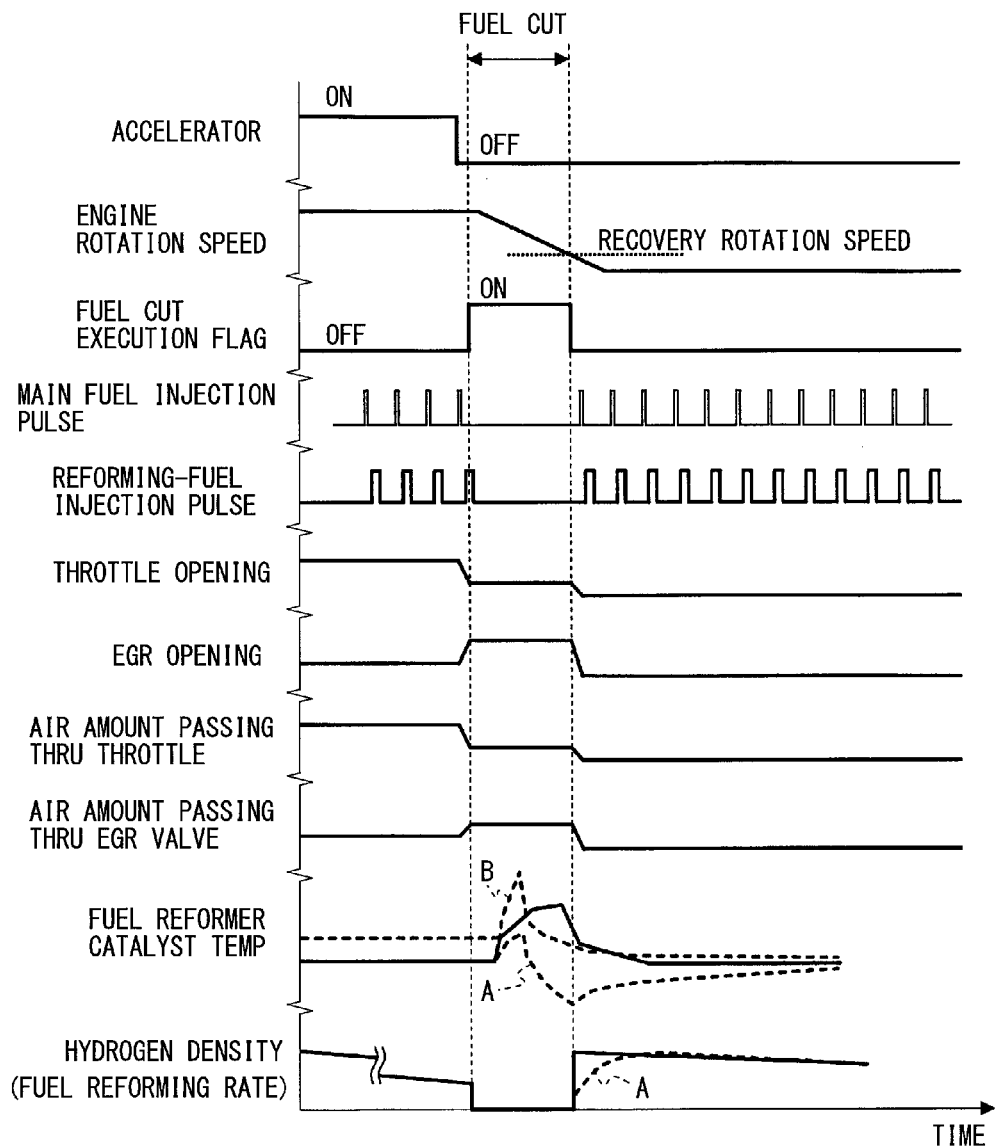
FIG. 4 is a time chart of an opening degree adjustment according to temperature of a fuel reformer catalyst.

As a counter measure for such a situation, (i) an EGR opening increase process that increases an EGR opening in proportion to the temperature of the fuel reformer catalyst 36, i.e., the lower the temperature of the catalyst 36 is, the more the EGR opening is increased, and (ii) an throttle opening decrease process that increases a throttle opening in proportion to the temperature of the fuel reformer catalyst 36, i.e., the lower the temperature of the catalyst 36 is, the more the throttle opening is decreased are respectively performed in the present embodiment, which is shown in a solid line in FIG. 4.

The amount of oxygen supplied to the fuel reformer catalyst 36 is increased and the calorific value by carbon combustion is increased in proportion to the decrease of the temperature of the fuel reformer catalyst 36, by making the EGR opening increase in proportion to the decrease of the temperature of the fuel reformer catalyst 36. Thereby, the temperature of the fuel reformer catalyst 36 is kept in an appropriate range, and the fuel reform rate of the fuel reformer catalyst 36 after an end of the catalyst recovery control is improved.

Further, the additional air rate is decreased for controlling the temperature decrease of exhaust gas (i.e., gas flowing through the exhaust pipe 23) or the EGR gas (i.e., gas flowing through the EGR pipe 32). Further, the amount of the exhaust gas is decreased for the decrease of the heat dissipation from the fuel reformer catalyst 36 in proportion to the decrease of the temperature of the fuel reformer catalyst 36, by making the throttle opening decrease in proportion to the decrease of the temperature of the fuel reformer catalyst 36. Thereby, the temperature of the fuel reformer catalyst 36 is kept in an appropriate range, and the fuel reform rate of the fuel reformer catalyst 36 after an end of the catalyst recovery control is improved.

[Opening Adjustment when the Fuel Reformer Catalyst 36 is at High Temperature]

If an EGR opening is large when the temperature of the fuel reformer catalyst 36 is high, the amount of oxygen supplied to the fuel reformer catalyst 36 will increase and the calorific value by carbon combustion will increase. Therefore, the temperature of the fuel reformer catalyst 36 rises to be too high, and the fuel reformer catalyst 36 may be damaged by heat (i.e., referring to a broken line B in FIG. 4).

Further, if a throttle opening is small when the temperature of the fuel reformer catalyst 36 is high, the additional air rate decreases and the temperature decrease of the exhaust gas (i.e., gas flowing through the exhaust pipe 23) or the EGR gas (i.e., gas flowing through the EGR pipe 32) is prevented, and the flow amount of the exhaust gas decreases and the heat dissipation from the fuel reformer catalyst 36 decreases. As a result, the temperature of the fuel reformer catalyst 36 rises to be too high, and the fuel reformer catalyst 36 may be damaged by heat (i.e., referring to a broken line B in FIG. 4).

As a counter measure for such a situation, (i) an EGR opening decrease process and (ii) a throttle opening increase process are performed when the temperature or a temperature increase speed of the fuel reformer catalyst 36 exceeds a predetermined value in the present embodiment.

When the temperature or the temperature increase speed of the fuel reformer catalyst 36 exceeds a predetermined value, by decreasing the EGR opening, the amount of oxygen supplied to the fuel reformer catalyst 36 is decreased and the calorific value by carbon combustion is decreased. Thereby, the temperature rise of the fuel reformer catalyst 36 is controlled, and the heat damage of the fuel reformer catalyst 36 is prevented.

Further, when the temperature or the temperature increase speed of the fuel reformer catalyst 36 exceeds a predetermined value, by increasing the throttle opening, the additional air rate is increased for facilitating the temperature decrease of exhaust gas (i.e., gas flowing through the exhaust pipe 23) or the EGR gas (i.e., gas flowing through the EGR pipe 32), and the flow amount of the exhaust gas is increased for increasing the heat dissipation of the fuel reformer catalyst 36. Thereby, the temperature rise of the fuel reformer catalyst 36 is controlled, and the heat damage of the fuel reformer catalyst 36 is prevented.

[Opening Adjustment According to the Carbon Deposit Amount of the Fuel Reformer Catalyst 36]

Further, in the present embodiment, the following processes are performed. That is, an EGR opening increase process, which increases the EGR opening in proportion to the carbon deposit amount of the fuel reformer catalyst 36, and a throttle opening increase process, which increases the throttle opening in proportion to the carbon deposit amount of the fuel reformer catalyst 36.

In such manner, when the carbon deposit amount of the fuel reformer catalyst 36 increases, the required oxygen for burning the deposit is increased by the increase of the EGR opening, which enables a quick and efficient recovery of the fuel reforming capacity of the fuel reformer catalyst 36.

[Opening Adjustment when Fuel Reforming Capacity is Recovered before an End of a Fuel Cut].

Figure 5:
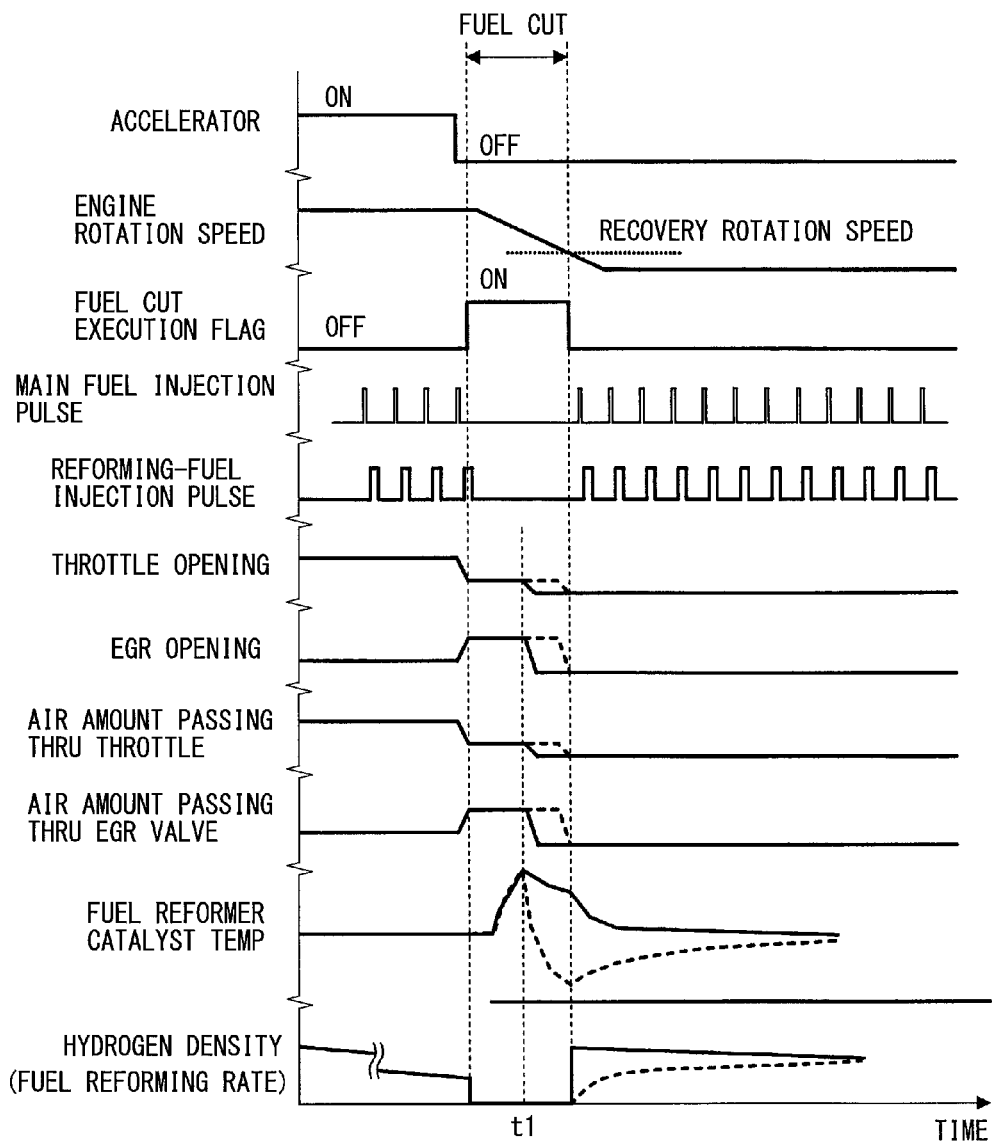
FIG. 5 is a time chart of an opening degree adjustment when a fuel reforming capacity is recovered before an end of a fuel cut process.

In case that the fuel reforming capacity of the fuel reformer catalyst 36 has recovered before an end of a fuel cut, if the EGR valve 34 and the throttle valve 16 are kept in a valve open state after the recovery of the fuel reforming capacity of the fuel reformer catalyst 36 during a fuel cut as shown by a broken line in FIG. 5, the additional air continues to flow into the EGR pipe 32 or the exhaust pipe 23, the fuel reformer catalyst 36 is cooled and the temperature of the fuel reformer catalyst 36 decreases, which results in a decrease of the fuel reform rate of the fuel reformer catalyst 36 after an end of a fuel cut (i.e., after a restart of fuel injection).

Therefore, in the present embodiment, as shown in a solid line in FIG. 5, when the catalyst recovery controller 37 determines that the fuel reforming capacity of the fuel reformer catalyst 36 has recovered before an end of a fuel cut, both of the EGR valve 34 and the throttle valve 16 are immediately closed by performing a valve close process at such moment, i.e., at time t1.

In such manner, when the fuel reforming capacity of the fuel reformer catalyst 36 has recovered before an end of a fuel cut, the EGR valve 34 and the throttle valve 16 are closed promptly, and the additional air is prevented from flowing into the EGR pipe 32 or the exhaust pipe 23. Thus, by preventing the temperature decrease of the fuel reformer catalyst 36, the fuel reform rate of the fuel reformer catalyst 36 after an end of a fuel cut (i.e., after a restart of fuel injection) is prevented from deterioration.

Further, in the present embodiment, whether the fuel reforming capacity of the fuel reformer catalyst 36 has recovered is determined based on (A) whether a temperature change trend of the fuel reformer catalyst 36 has decreased after a start of the catalyst recovery control or (B) whether a catalyst recovery amount derived from an additional air amount that is supplied to the fuel reformer catalyst 36 after a start of the catalyst recovery control is equal to or greater than a preset amount.

After the start of the catalyst recovery control, while the carbon deposit amount of the fuel reformer catalyst 36 is still large, the temperature of the fuel reformer catalyst 36 rises by the heat from carbon combustion. However, when the carbon deposit amount of the fuel reformer catalyst 36 decreases, the calorific value by carbon combustion will decrease and the temperature of the fuel reformer catalyst 36 will begin to decrease. That is, if the carbon deposit amount of the fuel reformer catalyst 36 decreases and the fuel reforming capacity of the fuel reformer catalyst 36 are recovered, the temperature of the fuel reformer catalyst 36 will begin to decrease. Therefore, whether the temperature of the fuel reformer catalyst 36 starts to decrease after the start of the catalyst recovery control is used as a sufficiently-accurate indicator of whether the fuel reforming capacity of the fuel reformer catalyst 36 has recovered.

Further, in proportion to the additional air amount/volume supplied to the fuel reformer catalyst 36 after the start of the catalyst recovery control, the carbon deposit amount of the fuel reformer catalyst 36 decreases and the catalyst recovery amount (i.e., an amount of decrease of the carbon deposit) increases. Therefore, based on whether the catalyst recovery amount derived/calculated from the additional air volume supplied to the fuel reformer catalyst 36 exceeds a predetermined value, whether the fuel reforming capacity of the fuel reformer catalyst 36 has recovered is determined with a sufficient accuracy.

Figure 6:
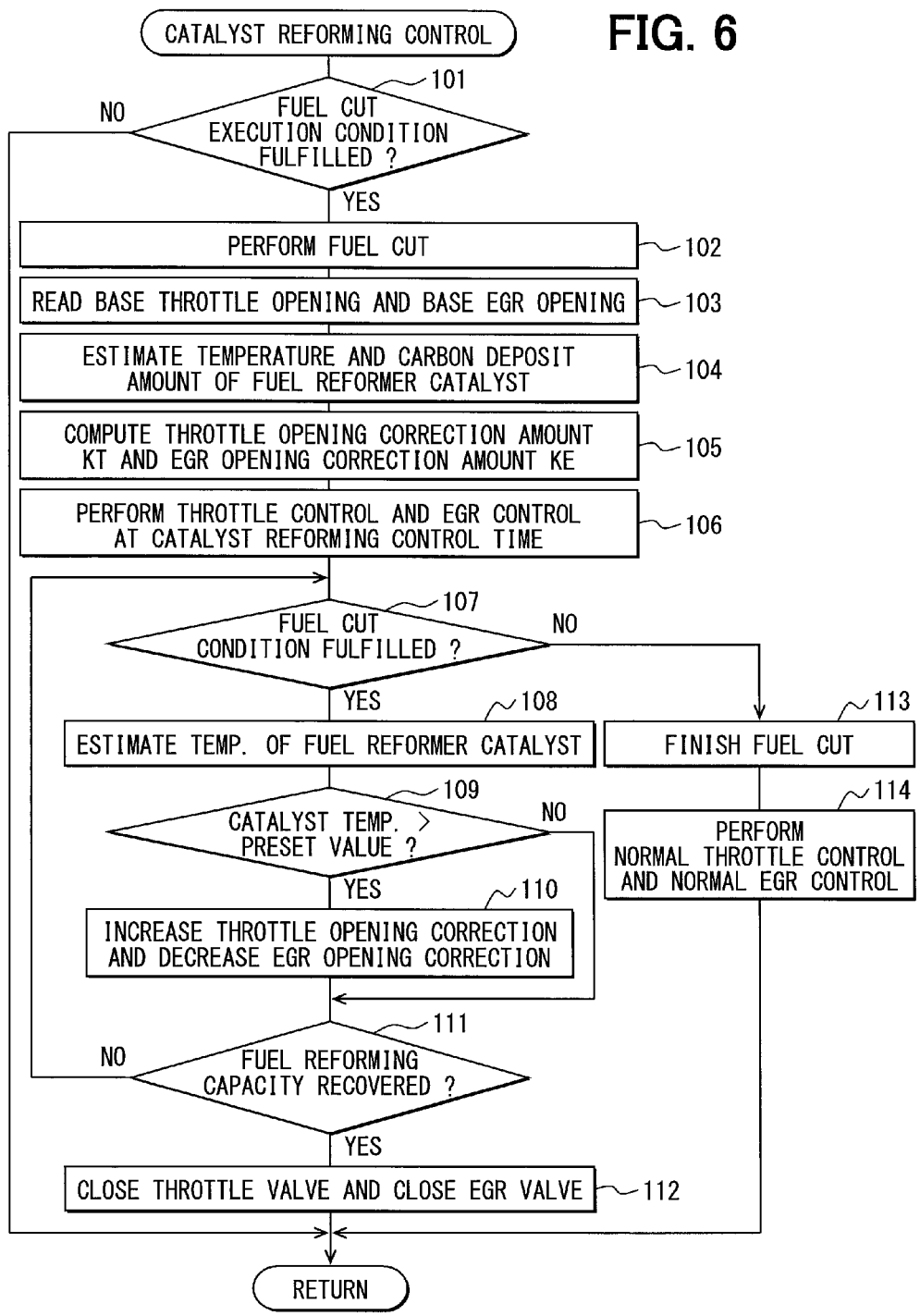
FIG. 6 is a flowchart of a the catalyst recovery control program.

The catalyst recovery control of the present embodiment described above is performed by the ECU 37 according to the catalyst recovery control program of FIG. 6. Hereafter, the contents of such program are described.

The catalyst recovery control program shown in FIG. 6, serving as a catalyst recovery controller in the claims, is repeatedly executed at a given interval during a power turn-on period of the ECU 37 (i.e., during an ON period of an ignition switch).

If this program is started, first, at Step 101, whether a fuel cut execution condition is satisfied determined based on whether an accelerator is OFF and an engine rotation speed is equal to or greater than a predetermined recovery rotation speed, for example. This program is ended without performing a process about the catalyst recovery control after Step 102, when it is determined at this Step 101 that a fuel cut execution condition is not satisfied.

On the other hand, at the above-mentioned Step 101, when it is determined that the fuel cut execution condition is satisfied, a process about the catalyst recovery control after Step 102 is performed in the following manner. First, at Step 102, an injection of the main fuel by the main fuel injection valve 21 is stopped and a fuel cut which stops an injection of the reforming-fuel by the reforming-fuel injection valve 35 is performed. In this case, a fuel cut may be started after performing a throttle control and an EGR control at the time of the catalyst recovery control at Step 106 mentioned later.

Then, the process proceeds to Step 103 and a base throttle opening and a base EGR opening at the time of the catalyst recovery control are read. In this case, for example, the throttle opening before fuel cut execution is read as a base throttle opening at the time of the catalyst recovery control, and the EGR opening before fuel cut execution is read as a base EGR opening at the time of the catalyst recovery control.

Then, the process proceeds to Step 104, and the temperature and a carbon deposit amount of the fuel reformer catalyst 36 are estimated based on engine operation conditions (e.g., an intake air amount, an intake-air temperature, a throttle opening, an EGR opening, coolant temperature, etc.). Alternatively, at least one of the temperature and the carbon deposit amount of the fuel reformer catalyst 36 may be detected by using sensors.

Then, the process proceeds to Step 105, and a throttle opening correction amount KT and an EGR opening correction amount KE are computed in the following manner.

Figure 7:
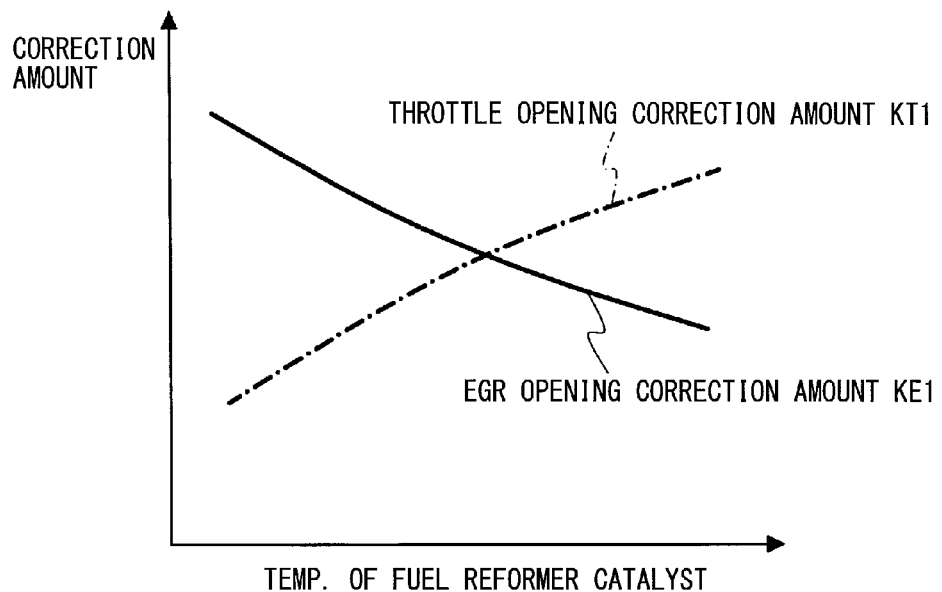
FIG. 7 is a diagrammatical map of a correction amount according to the temperature of the fuel reformer catalyst.

That is, with reference to a map of a throttle opening correction amount KT1 shown in FIG. 7, the throttle opening correction amount KT1 is computed according to the temperature of the fuel reformer catalyst 36, and, with reference to a map of an EGR opening correction amount KE1 shown in FIG. 7, the EGR opening correction amount KE1 is computed according to the temperature of the fuel reformer catalyst 36.

According to the map of the throttle opening correction amount KT1, the lower the temperature of the fuel reformer catalyst 36 is, the throttle opening correction amount KT1 is configured to become smaller, for the decrease of the throttle opening. According to the map of EGR opening correction amount KE1, the lower the temperature of the fuel reformer catalyst 36 is, the EGR opening correction amount KE1 is configured to become larger, for the increase of the EGR opening. These maps of the throttle opening correction amount KT1 and the EGR opening correction amount KE1 are created in advance based on test data, design data, etc., and are memorized in a ROM of the ECU 37.

Figure 8:
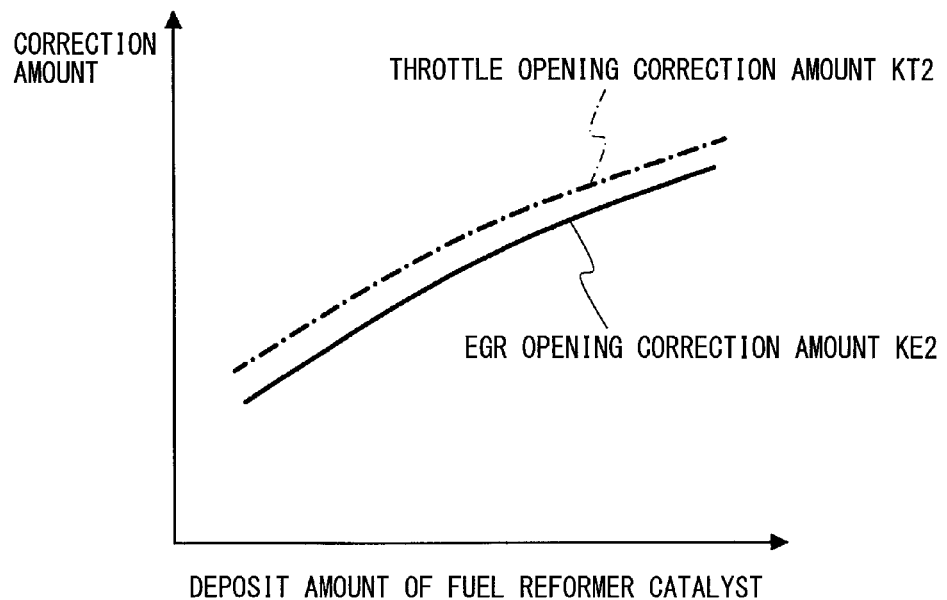
FIG. 8 is another diagrammatical map of a correction amount according to a carbon deposit amount of the fuel reformer catalyst.

With reference to the map of a throttle opening correction amount KT2 shown in FIG. 8, the throttle opening correction amount KT2 is computed according to the carbon deposit amount of the fuel reformer catalyst 36, and, with reference to the map of an EGR opening correction amount KE2 shown in FIG. 8, the EGR opening correction amount KE2 is computed according to the carbon deposit amount of the fuel reformer catalyst 36.

According to the map of the throttle opening correction amount KT2, the greater the carbon deposit amount of the fuel reformer catalyst 36 is, the throttle opening correction amount KT2 is configured to become larger, for the increase of the throttle opening. According to the map of the EGR opening correction amount KE2, the greater the carbon deposit amount of the fuel reformer catalyst 36 is, the EGR opening correction amount KE2 is configured to become larger, for the increase of the EGR opening. These maps of the throttle opening correction amount KT2 and the EGR opening correction amount KE2 are created in advance based on test data, design data, etc., and are memorized in a ROM of the ECU 37.

Thus, after computing the throttle opening correction amounts KT1 and KT2 and the EGR opening correction amounts KE1 and KE2, by adding the throttle opening correction amount KT2 to the throttle opening correction amount KT1, a final throttle opening correction amount KT is calculated, and, by adding the EGR opening correction amount KE2 to the EGR opening correction amount KE1, a final EGR opening correction amount KE is calculated.

Then, the process proceeds to Step 106, and the throttle control and the EGR control at the time of the catalyst recovery control are performed. In the throttle control of the catalyst recovery control, the throttle opening correction amount KT is added to the base throttle opening for having a catalyst recovery control time target throttle opening, and the throttle control of the catalyst recovery control is performed to control a throttle opening to the catalyst recovery control time target throttle opening.

Further, in the same step, as the EGR control of the catalyst recovery control, the EGR opening correction amount KE is added to the base EGR opening for having a catalyst recovery control time target EGR opening, and the EGR control of the catalyst recovery control is performed to control an EGR opening to the catalyst recovery control time target EGR opening.

Then, the process proceeds to Step 107, and it is determined whether the fuel cut execution condition is satisfied, and, when it is determined that the fuel cut execution condition is being satisfied, the fuel cut is continued, and the process proceeds to Step 108, and the temperature of the fuel reformer catalyst 36 is estimated or detected.

Then, the process proceeds to Step 109, and it is determined whether the temperature of the fuel reformer catalyst 36 exceeds a predetermined value, or whether the temperature increase speed of the fuel reformer catalyst 36 exceeds a predetermined value.

At this Step 109, when it is determined that the temperature of the fuel reformer catalyst 36 is equal to or smaller than a predetermined value, or when it is determined that the temperature increase speed of the fuel reformer catalyst 36 is equal to or smaller than a predetermined value, the throttle opening and the EGR opening are maintained (i.e., kept unchanged), and the process proceeds to Step 111.

On the other hand, when it is determined that the temperature of the fuel reformer catalyst 36 has exceeded a predetermined value, or when it is determined that the temperature increase speed of the fuel reformer catalyst 36 has exceeded a predetermined value at the above-mentioned Step 109, considering a possibility of heat damage of the fuel reformer catalyst 36, the process proceeds to Step 110, and an increase correction of the throttle opening is performed, and a decrease correction of the EGR opening is performed. Under the present circumstances, the amount of the increase correction of the throttle opening and the amount of the decrease correction of the EGR opening may be set to a fixed value in advance, respectively, or it may be set according to the temperature of the fuel reformer catalyst 36, etc.

Then, after proceeding to Step 111, whether the fuel reforming capacity of the fuel reformer catalyst 36 is recovered is determined based on (i) whether the temperature of the fuel reformer catalyst 36 starts to decrease after the start of the catalyst recovery control, or (ii) whether the catalyst recovery amount calculated from the additional air amount/volume supplied to the fuel reformer catalyst 36 after the start of the catalyst recovery control exceeds the predetermined value. When it is determined that the fuel reforming capacity of the fuel reformer catalyst 36 has not yet recovered at this Step 111, the process returns to the above-mentioned step 107.

Then, thereafter, when the catalyst recovery controller 37 determines that the fuel reforming capacity of the fuel reformer catalyst 36 has recovered at Step 111, that is, when it is determined that the fuel reforming capacity of the fuel reformer catalyst 36 has recovered before an end of a fuel cut, the process proceeds to Step 112, and the throttle valve 16 is closed and the EGR valve 34 is closed.

On the other hand, at the above-mentioned Step 107, when it is determined that the fuel cut execution condition is not satisfied, the process proceeds to Step 113, by ending a fuel cut, an injection of the main fuel is resumed, and an injection of the reforming-fuel is resumed.

Then, the process proceeds to Step 114, and a normal throttle control and a normal EGR control are performed. In the normal throttle control, a target throttle opening according to an engine operation condition or the like is calculated, and the throttle opening is controlled by the usual throttle control to have such target throttle opening. Further, in the normal EGR control, a target EGR opening according to an engine operation condition etc. is calculated, and the EGR opening is controlled by the usual EGR control to have the target EGR opening.

When deterioration of the fuel reformer catalyst is detected (i.e., when the fuel reforming capacity degrades), the conventional catalyst recovery control (i.e., the catalyst recovery control of the patent document 1) stops the injection of the reforming-fuel by the reforming-fuel injection valve, and supplies oxygen to the fuel reformer catalyst by controlling the air-fuel ratio of the exhaust gas to the lean side, as shown in FIG. 9A, for the recovery of the fuel reforming capacity of the fuel reformer catalyst.

In such a case, in order to perform the catalyst recovery control which stops injection of the reforming-fuel during an operation of the engine (i.e., while the engine combustion continues), when the catalyst recovery control is performed during an operation of the engine, the reforming component density in the EGR gas decreases greatly by the stop of the injection of the reforming-fuel, and the engine flammability decreases. Therefore, the fuel consumption rate improvement effect decreases, and the exhaust emission and/or drivability may get worse.

On the other hand, in the catalyst recovery control of the present embodiment, as shown in FIG. 9B, when a predetermined fuel cut execution condition is satisfied, the fuel cut which stops the injection of both of the main fuel and the reforming-fuel is performed and, by maintaining both of the EGR valve 34 and the throttle valve 16 in a valve open state during this fuel cut, the clean air (i.e., oxygen) is introduced into the EGR pipe 32, thereby supplying large volume of oxygen to the fuel reformer catalyst 36. In such manner, the carbon deposit on the fuel reformer catalyst 36 is burned promptly, and the fuel reforming capacity of the fuel reformer catalyst 36 is quickly recovered.

In this case, since the catalyst recovery control is performed in an engine combustion stopped state (i.e., while the engine 11 is not operating) by performing the fuel cut when the fuel cut execution condition is satisfied, even if the reforming component density in the EGR gas decreases greatly by the stop of the injection of the reforming-fuel, the decrease of a fuel consumption rate improvement effect is prevented and worsening of the exhaust emission or worsening of the drivability will not be caused. Further, it is not necessary to newly install a device etc. for supplying oxygen to the fuel reformer catalyst 36, which also reduces cost.

In the present embodiment, the temperature and the carbon deposit amount of the fuel reformer catalyst 36 are estimated or detected as a state of the fuel reformer catalyst 36 when performing the catalyst recovery control, and the EGR opening and the throttle opening are adjusted according to the estimation, i.e., according to the temperature and carbon deposit amount of the fuel reformer catalyst 36. Therefore, the EGR opening and the throttle opening are properly set according to the temperature and carbon deposit amount of the fuel reformer catalyst 36. Thereby, the fuel reforming capacity of the fuel reformer catalyst 36 is recovered efficiently, while preventing the heat deterioration of the fuel reformer catalyst 36 or the decrease of the fuel reform rate after an end of the catalyst recovery control.

Although the present disclosure has been fully described in connection with preferred embodiment thereof with reference to the accompanying drawings, it is to be noted that various changes and modifications may become apparent to those skilled in the art, For example, in the above-mentioned embodiment, both of the EGR opening increase process and the throttle opening decrease process are performed when the temperature of the fuel reformer catalyst 36 decreases, only one of the above two processes may be performed in the same situation.

Further, although, in the above-mentioned embodiment, both of the EGR opening decrease process and the throttle opening increase process are performed when the temperature or the temperature increase speed of the fuel reformer catalyst 36 exceeds a predetermined value, only one of the two processes may be performed in the same situation.

Further, although, in the above-mentioned embodiment, both of the EGR opening increase process and the throttle opening increase process are performed when the carbon deposit amount of the fuel reformer catalyst 36 increases, only one of the two processes may be performed in the same situation.

Further, although, in the above-mentioned embodiment, both of a process for closing the EGR valve 34 and a process for closing the throttle valve 16 are performed when it is determined that the fuel reforming capacity of the fuel reformer catalyst 36 has recovered before an end of a fuel cut, only one of the two processes may be performed in the same situation.

Further, although, in the above-mentioned embodiment, the EGR opening and the throttle opening are adjusted according to both of the temperature of the fuel reformer catalyst 36 and the carbon deposit amount, the adjustment may be based on only one of the two conditions.

Further, the present disclosure is not limited to an inlet-port-fuel-injection type engine as shown in FIG. 1, but may also be applicable to other type engines, such as an in-cylinder injection type engine, a dual injection type engine that is equipped with both of a fuel injection valve for an inlet port injection and a fuel injection valve for a cylinder injections.

Such changes, modifications, and summarized schemes are to be understood as being within the scope of the present disclosure as defined by appended claims.

What is claimed is:

1. A fuel reformer for an internal combustion engine comprising:
a main fuel injector injecting a main fuel that is supplied to an internal combustion engine; a throttle valve adjusting an intake air amount for the engine;
an EGR passage returning a portion of an exhaust gas from an exhaust passage of the engine to an air-intake passage as an EGR gas;
an EGR valve adjusting a flow amount of the EGR gas;
a reforming-fuel injector injecting a reforming-fuel into the EGR passage;
a fuel reformer catalyst disposed in the EGR passage and reforming the reforming-fuel injected by the reforming-fuel injector; and
a catalyst recovery controller configured to execute a catalyst recovery control that includes (i) performing a fuel cut, which stops an injection of the main fuel and the reforming-fuel, and (ii) maintaining the EGR valve and the throttle valve in a valve open state to supply additional air to the fuel reformer catalyst and recover a fuel reforming capacity of the fuel reformer catalyst.

2. The fuel reformer of claim 1, wherein
the catalyst recovery controller adjusts at least one of the EGR valve opening or the throttle valve opening according to a state of the fuel reformer catalyst when performing a catalyst recovery control.

3. The fuel reformer of claim 2, wherein
the catalyst recovery controller estimates or detects the state of the fuel reformer catalyst according to at least one of a temperature or a carbon deposit amount of the fuel reformer catalyst.

4. The fuel reformer of claim 3, wherein
when the temperature of the fuel reformer catalyst decreases, the catalyst recovery controller at least one of increases the EGR valve opening or decreases the throttle valve opening.

5. The fuel reformer of claim 3, wherein
when one of the temperature of the fuel reformer catalyst or a temperature increase speed of the fuel reformer catalyst exceeds a threshold, the catalyst recovery controller decreases the EGR valve opening or increases the throttle valve opening.

6. The fuel reformer of claim 3, wherein
when the carbon deposit amount on the fuel reformer catalyst increases, the catalyst recovery controller at least one of increases the EGR valve opening or increases the throttle valve opening.

7. The fuel reformer of claim 1, wherein
when the catalyst recovery controller determines that a fuel reforming capacity of the fuel reformer catalyst has recovered before an end of the fuel cut, the catalyst recovery controller controls at least one of immediately decreases the EGR valve opening or immediately decreases the throttle valve opening.

8. The fuel reformer of claim 7, wherein
the catalyst recovery controller determines whether the fuel reforming capacity of the fuel reformer catalyst has recovered based on
(A) whether a temperature change trend of the fuel reformer catalyst has decreased after a start of the catalyst recovery control, or
(B) whether a catalyst recovery amount derived from an additional air amount that is supplied to the fuel reformer catalyst after the start of the catalyst recovery control is equal to or greater than a preset amount.

9. The fuel reformer of claim 1, wherein both of the EGR valve and the throttle valve are in the valve open state during the fuel cut.

* * * * *